United States Patent
Kuijpers

(10) Patent No.: US 12,377,608 B2
(45) Date of Patent: Aug. 5, 2025

(54) EXTRUDER SYSTEM AND ADDITIVE MANUFACTURING PRINTER, COMPRISING SUCH AN EXTRUDER

(71) Applicant: Innotech Europe B.V., Moergestel (NL)

(72) Inventor: Petrus Adrianus Johannes Maria Kuijpers, Moergestel (NL)

(73) Assignee: Albico Beheer B.V., Rijen (NL)

( * ) Notice: Subject to any disclaimer, the term of this patent is extended or adjusted under 35 U.S.C. 154(b) by 123 days.

(21) Appl. No.: 18/568,171

(22) PCT Filed: Jun. 2, 2022

(86) PCT No.: PCT/NL2022/050307
§ 371 (c)(1),
(2) Date: Dec. 7, 2023

(87) PCT Pub. No.: WO2022/260512
PCT Pub. Date: Dec. 15, 2022

(65) Prior Publication Data
US 2024/0278500 A1     Aug. 22, 2024

(30) Foreign Application Priority Data
Jun. 7, 2021 (NL) ..................................... 2028398

(51) Int. Cl.
B29C 64/321     (2017.01)
B29C 48/05     (2019.01)
(Continued)

(52) U.S. Cl.
CPC ............ *B29C 64/321* (2017.08); *B29C 48/05* (2019.02); *B29C 48/55* (2019.02); *B29C 64/106* (2017.08);
(Continued)

(58) Field of Classification Search
CPC .............................. B29C 48/55; B29C 64/106
See application file for complete search history.

(56) References Cited

U.S. PATENT DOCUMENTS

| | | | | |
|---|---|---|---|---|
| 6,168,411 B1 * | 1/2001 | Wildman | ............ | B29C 48/6945 |
| | | | | 425/197 |
| 7,891,964 B2 * | 2/2011 | Skubic | .................. | B29C 48/37 |
| | | | | 425/375 |

(Continued)

FOREIGN PATENT DOCUMENTS

| | | | |
|---|---|---|---|
| CN | 110901052 A | | 3/2020 |
| EP | 3112133 A1 | | 1/2017 |

(Continued)

OTHER PUBLICATIONS

European Patent Office, International Search Report for International Application No. PCT/NL2022/050307, dated Sep. 9, 2022, 4 pages.

*Primary Examiner* — Atul P. Khare
(74) *Attorney, Agent, or Firm* — Suiter Swantz IP

(57) ABSTRACT

The extruder system includes a supply configured to receive raw material and comprising a heater configured to melt the raw material into extrudable material, an extruder configured to receive the extrudable material from the supply and comprising a screw conveyor configured to convey the extrudable material towards an extrusion nozzle of the extruder and cause an overpressure inside the extruder to allow selective extrusion via the extrusion nozzle. The extruder further includes a plunger arranged at or near the extrusion nozzle and configured to selectively release at least a part of the overpressure and thereby control a flow of extrudable material out of the extrusion nozzle to reduce oozing of extrudable material after stopping the flow.

20 Claims, 11 Drawing Sheets

(51) Int. Cl.
  *B29C 48/55*      (2019.01)
  *B29C 64/106*     (2017.01)
  *B29C 64/209*     (2017.01)
  *B33Y 10/00*      (2015.01)
  *B29C 64/118*         (2017.01)
  *B33Y 30/00*          (2015.01)

(52) U.S. Cl.
  CPC ............ *B29C 64/209* (2017.08); *B33Y 10/00* (2014.12); *B29C 64/118* (2017.08); *B33Y 30/00* (2014.12)

(56) References Cited

U.S. PATENT DOCUMENTS

| | | | | |
|---|---|---|---|---|
| 8,734,146 | B2* | 5/2014 | Durina | B29C 45/234 |
| | | | | 425/562 |
| 10,618,217 | B2* | 4/2020 | Boyd, IV | B29C 64/209 |
| 11,534,976 | B2* | 12/2022 | Yuwaki | G05B 19/182 |
| 11,845,213 | B2* | 12/2023 | Conrad | B29C 48/78 |
| 11,911,947 | B2* | 2/2024 | Yamamoto | B29C 45/78 |
| 2016/0303802 | A1* | 10/2016 | Meshorer | B29C 48/02 |

FOREIGN PATENT DOCUMENTS

| | | | | |
|---|---|---|---|---|
| EP | 3117982 | A1 | 1/2017 | |
| EP | 3656531 | A1 | 5/2020 | |
| WO | 2019116088 | A1 | 6/2019 | |
| WO | WO-2024205399 | A1 * | 10/2024 | ........... B29C 64/106 |

* cited by examiner

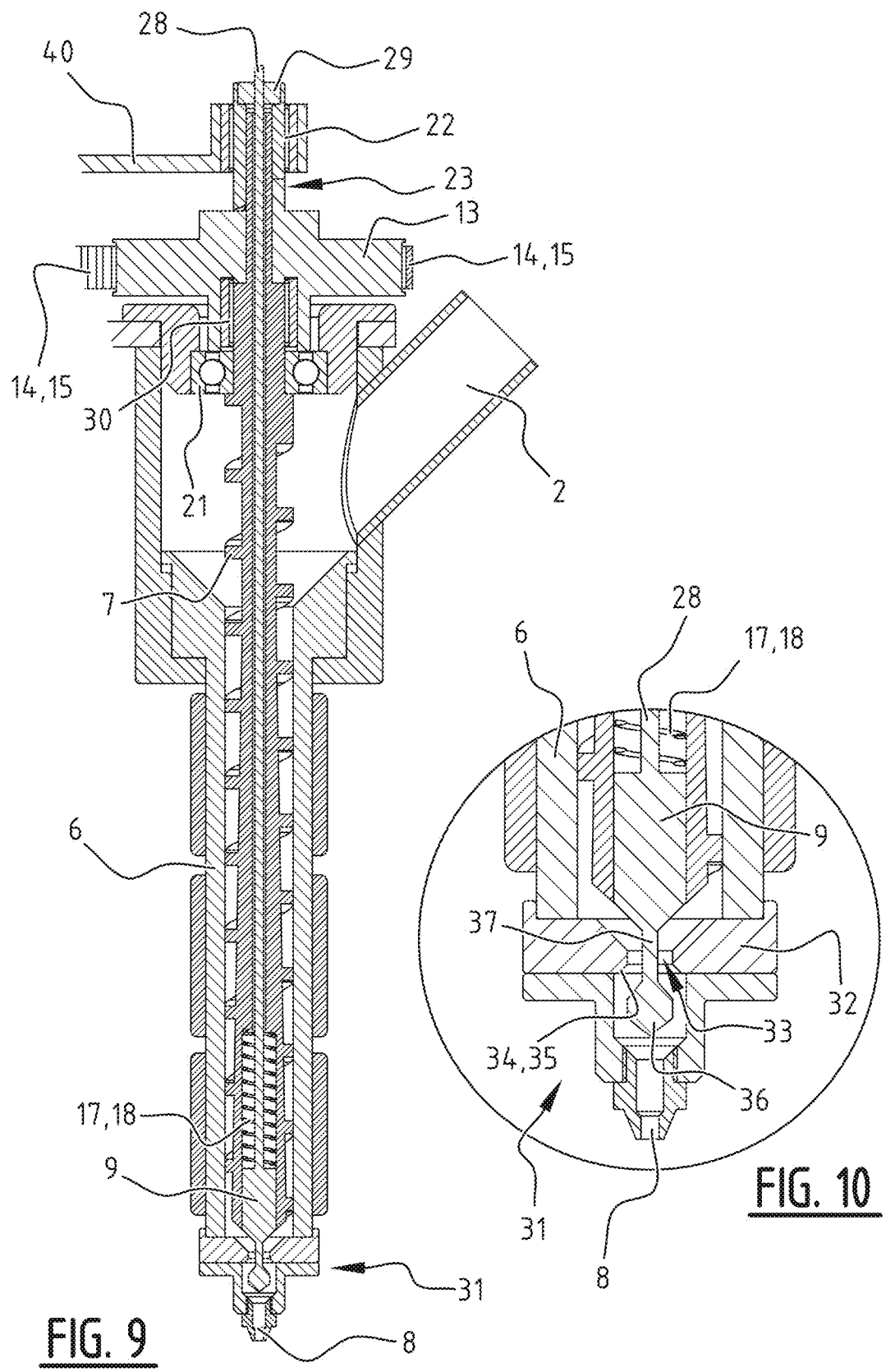

EXTRUDER SYSTEM AND ADDITIVE MANUFACTURING PRINTER, COMPRISING SUCH AN EXTRUDER

The present invention relates to an extruder system, and to an additive manufacturing printer, comprising such an extruder.

Extruder systems may be used for a large variety of applications, one of which is for extruding printing material in an additive manufacturing printer. "AM printer". The skilled person will however understand that the invention is not limited to the field of additive manufacturing. Other applications for extruder systems are dosing applications such as for glue, paste, solder or hot melt, especially if these substances are to be applied in a specific pattern. Moreover, extruders may be used to fill holders, sometimes requiring a high accuracy, for example for vaccines. Extruder systems may also be applied in mixing devices, for example for mixing paint or chemicals.

Extruder systems often apply a screw conveyor that is configured to convey extrudable material, in particular a molten raw material, towards an extrusion nozzle. Especially if the extrudable material is highly viscous, conveying thereof by rotating the screw conveyor results in a large pressure build up inside the extruder system. In an AM printer, the pressure in the extruder may for example be in the range of 70-100 bar. In order to stop a flow of extrudable material out of the extrusion nozzle, simply stopping rotating the screw conveyor may not result in an immediate stop of the flow, mainly due to the overpressure inside the extruder system. This results in oozing of the extrudable material. Although such oozing may not be an issue for some types of extruder system applications that require only a limited level of accuracy and control, it is considered a disadvantage for applications such as additive manufacturing. After all, the less oozing, the more accurate the to be printed product will be. Moreover, less oozing means better control, and therefore increased consistency in the quality of the to be printed products.

In addition to preventing oozing as much as possible, the (surface) quality of an additive manufactured product also benefits from a laminar flow at the extrusion nozzle, as well as from a homogeneous melt of extrudable material having a constant temperature and viscosity.

Prior art extruders systems are disclosed in the European patent applications EP 3 112 113 A1 and EP 3 117 982 A1, the international patent application WO 2019/116088 A1 and in the Chinese patent application CN 110 901 052 A.

An objective of the present invention is to provide an extruder system, that is improved relative to the prior art and wherein at least one of the above stated problems is obviated or alleviated.

Said objective is achieved with the extruder system according to claim 1 of the present invention, comprising:
- a supply configured to receive raw material and comprising a heater configured to melt the raw material into extrudable material;
- an extruder configured to receive the extrudable material from the supply and comprising a screw conveyor configured to convey the extrudable material towards an extrusion nozzle of the extruder and cause an overpressure inside the extruder to allow selective extrusion via said extrusion nozzle; and
- a plunger arranged at or near the extrusion nozzle and configured to selectively release at least a part of the overpressure and thereby control a flow of extrudable material out of said extrusion nozzle to reduce oozing of extrudable material after stopping said flow.

By actively releasing at least a part of the overpressure, the extruder system is able to reduce this oozing, thereby providing an improved control of the flow of extrudable material. By reducing the oozing, the accuracy and consistency of the extruder system is improved.

When the extruder system is part of an additive manufacturing printer. "AM printer", a reduction in oozing results in higher quality printed products. Moreover, the quality of the printed product will not only be better, but will also be more consistent.

According to a preferred embodiment, the extruder system is an extruder system of an additive manufacturing printer. "AM printer". Using such an extruder for an AM printer allows the AM printer to have a large freedom of choice regarding the raw material. The raw material is explicitly not limited to plastics that are suitable to be formed into a filament, which is a requirement of state of the art filament AM printers. For example the raw material may also comprise polymers or materials that are susceptible to breaking due to their brittleness, or highly flexible plastics.

The raw material is preferably a granulate, wherein the wording "granulate" covers any form of grains or particles, and explicitly also covers pellets and powders, which are considered granulates having a very fine texture. The extruder system is preferably a granulate extruder system. Such a granulate extruder system may also be referred to as a pellet extruder system.

The invention furthermore also relates to an additive manufacturing printer, "AM printer", comprising an extruder system according to the invention, and a controller configured to cause the extruder system to, when executing computer-executable printing instructions for printing an object, print said object.

Preferred embodiments are the subject of the dependent claims.

The various aspects and features described and shown in the specification can be applied, individually, wherever possible. These individual aspects, and in particular the aspects and features described in the attached dependent claims, may be an invention in its own right that is related to a different problem relative to the prior art. For example, a valve as applied in a preferred embodiment of the invention may also be applied in an extruder system, wherein a plunger is embodied in such a way that it reduces oozing without directly releasing at least a part of the overpressure.

In the following description preferred embodiments of the present invention are further elucidated with reference to the drawing, in which:

FIG. 9 is a cross-sectional side view of the extruder system according to a third preferred embodiment:

FIG. 10 is a detailed cross-sectional view of the extruder system according to the third preferred embodiment of FIG. 9;

Figure 1:
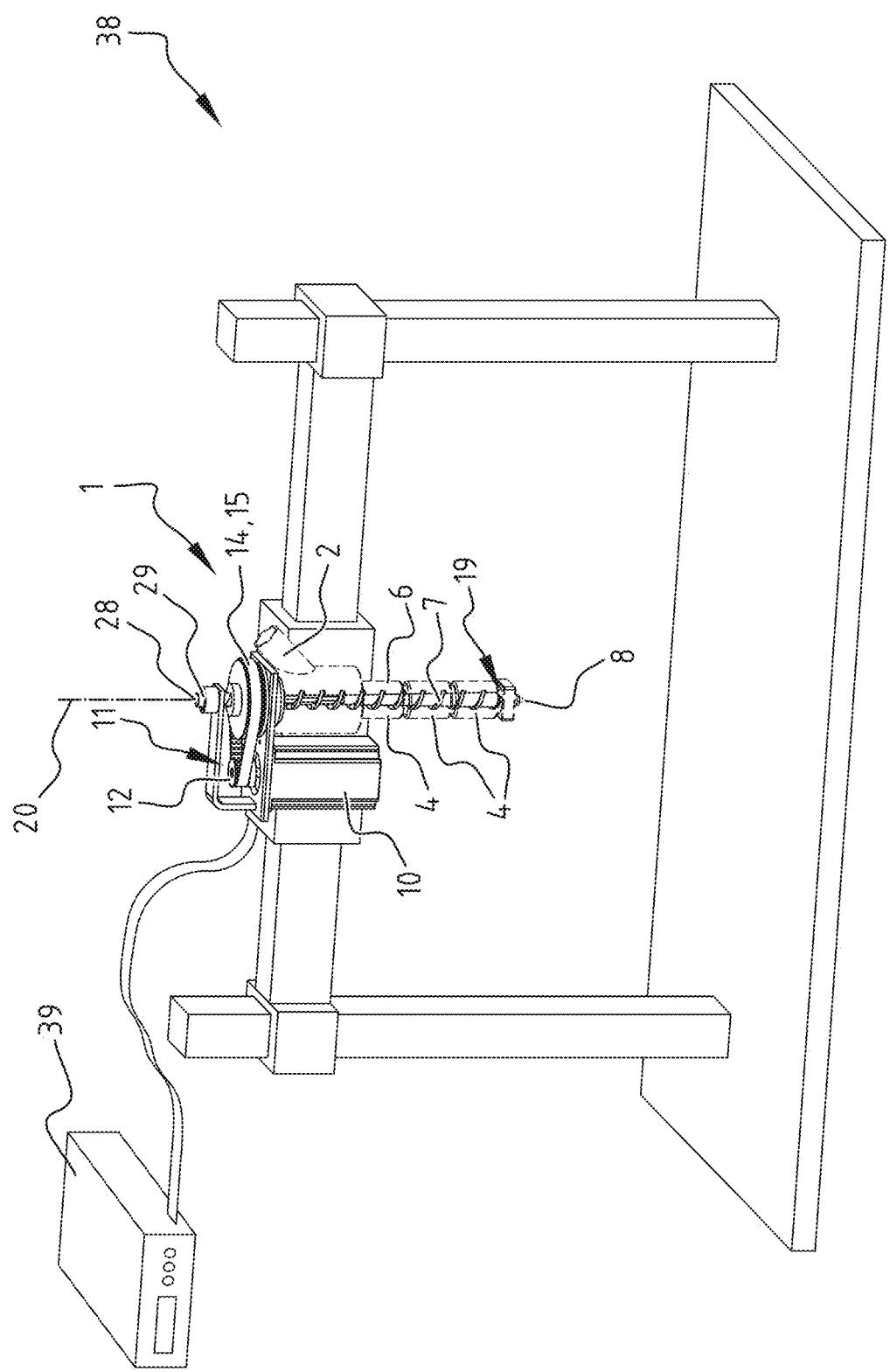
FIG. 1 is a perspective view of an extruder system according to one of the preferred embodiments of the invention.

The invention relates to an extruder system 1 that comprises a supply 2 configured to receive raw material 3 and that comprises a heater 4 configured to melt the raw material 3 into extrudable material 5. The extruder system 1 further comprises an extruder 6 configured to receive the extrudable material 5 from the supply 2 and that comprises a screw conveyor 7 configured to convey the extrudable material 5 towards an extrusion nozzle 8 of the extruder 6 and cause an overpressure inside the extruder 6 to allow selective extrusion via said extrusion nozzle 8. A plunger 9 is arranged at or near the extrusion nozzle 8 and the plunger 9 is configured to selectively release at least a part of the overpressure and thereby control a flow F of extrudable material 5 out of said extrusion nozzle 8 to reduce oozing of extrudable material 5 after stopping said flow F.

When raw material 3 is melted into extrudable material 5, often a relatively viscous composition is obtained. A typical viscosity may be in the range of $10^3$ to $10^{13}$ mPa·s. In order to convey this viscous extrudable material 5 towards the nozzle, a relatively high pressure is required. For example, the pressure in the extruder may be in the range of 70-100 bar. If the screw conveyor 7 is stopped from conveying the extrudable material 5 towards the extrusion nozzle 8, the pressure that has been build up inside the extruder 6 may continue to press extrudable material 5 out of the extrusion nozzle 8, which is known as oozing. By actively releasing at least a part of the overpressure, the extruder system 1 is able to reduce or this oozing, thereby providing an improved control of the flow F of extrudable material 5. When the extruder system 1 is part of an additive manufacturing printer. "AM printer", a reduction in oozing results in higher quality printed products. Moreover, the quality of the printed product will not only be better, but will also be more consistent.

The raw material may be a granulate and the extruder system 1 may be a granulate extruder system. It is mentioned that granulate covers any form of grains or particles, and explicitly also covers pellets and powders, which are considered granulates having a very fine texture. A granulate extruder system may also be referred to as a pellet extruder system. The supply 2 may be integrated in an upstream part of the extruder 6.

Figure 3A:
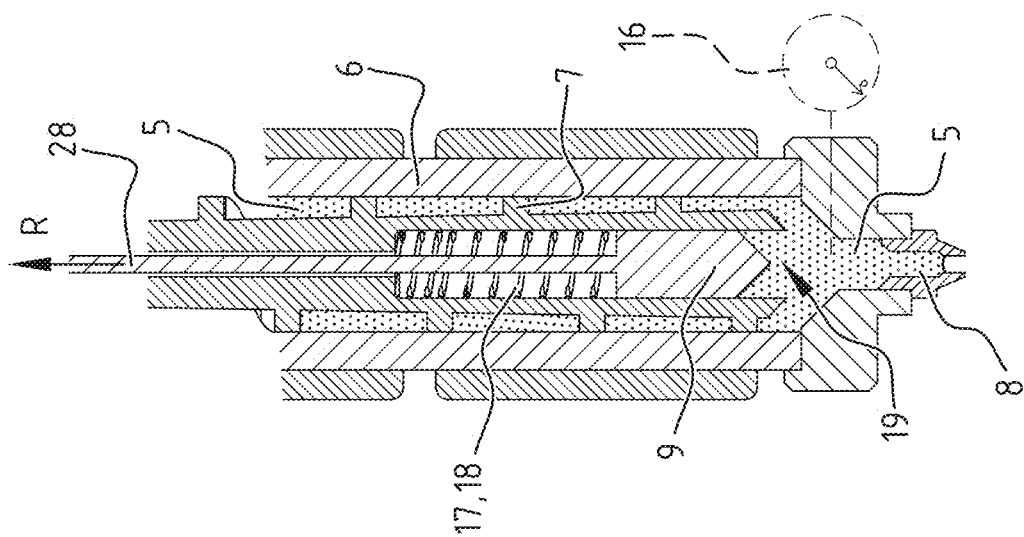
FIG. 3A is a detailed cross-sectional side view during extruding of the extruder system of FIG. 2.
Figure 3B:
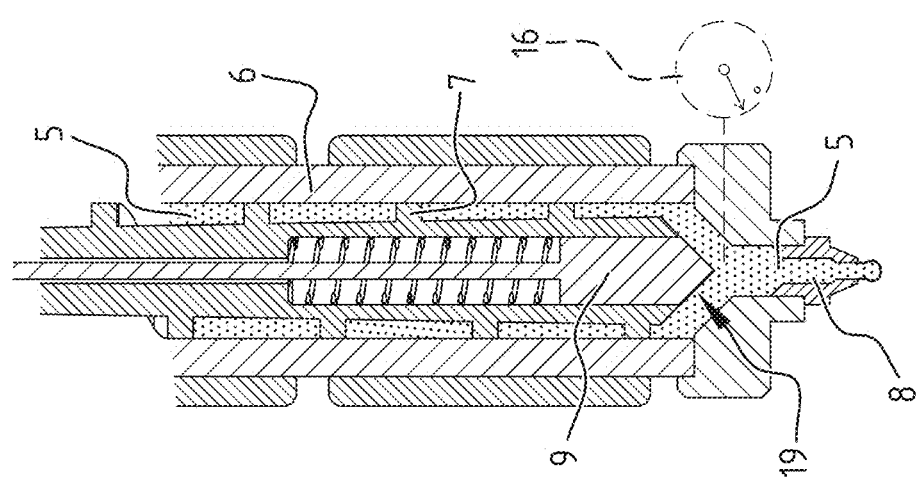
FIG. 3B is a detailed cross-sectional side view directly after stopping extruding of the extruder system of FIG. 2.
Figure 6A:
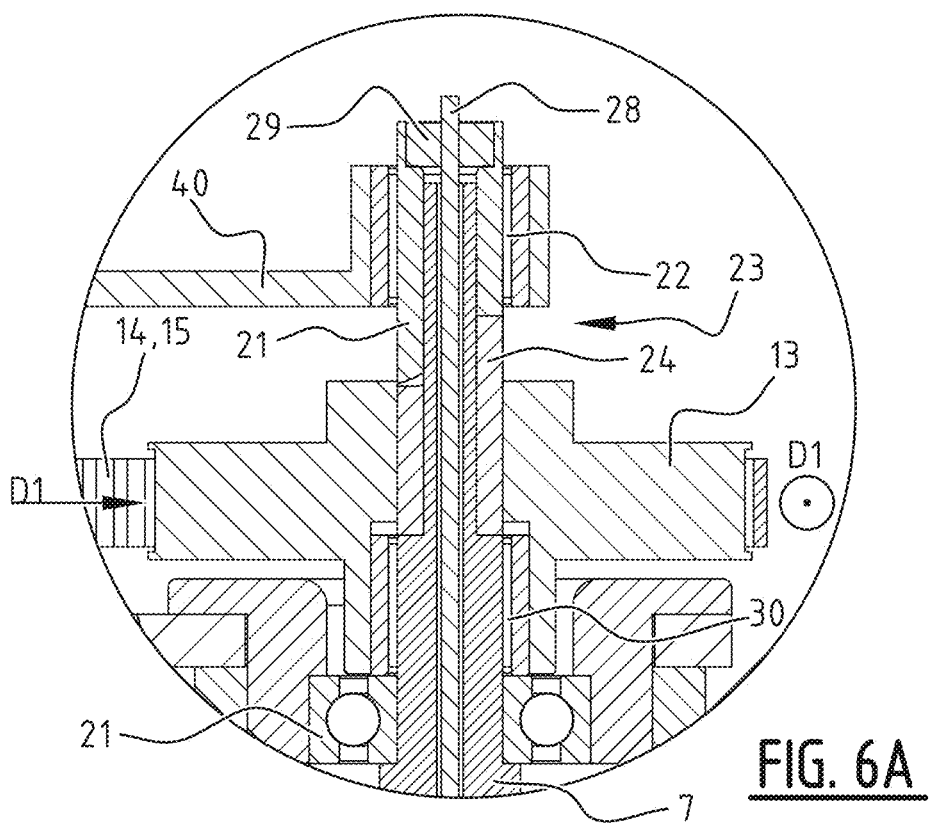
FIG. 6A is a detailed cross-sectional view during extruding of the extruder system according to the first preferred embodiment.
Figure 6B:
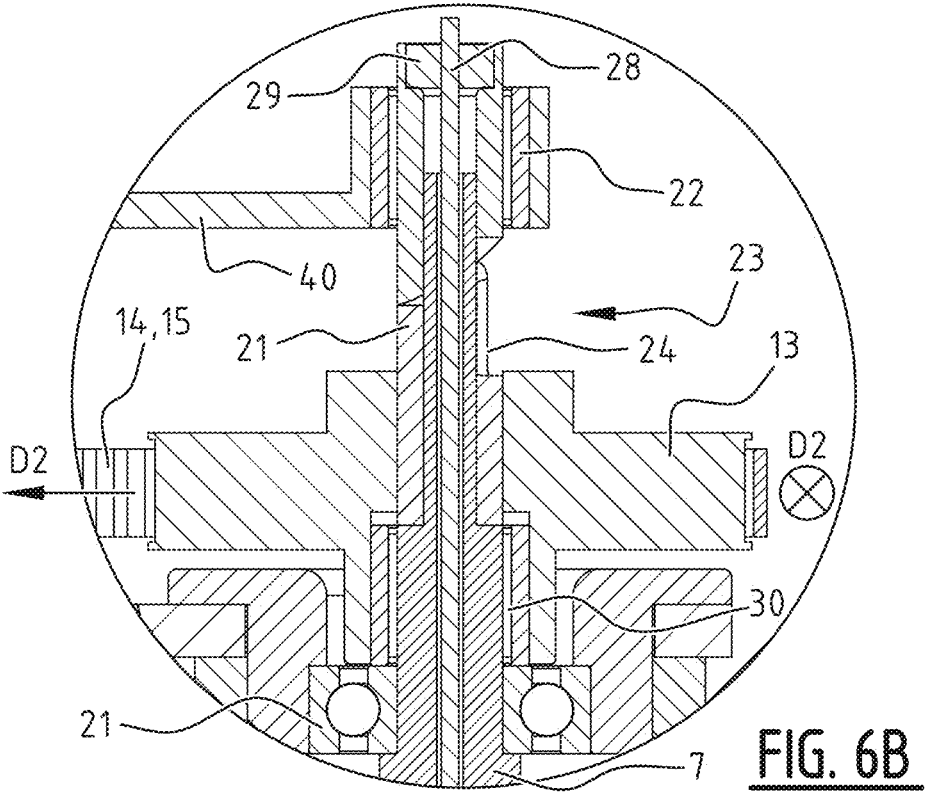
FIG. 6B is a detailed cross-sectional view during retracting the plunger of the extruder system according to the first preferred embodiment.

The extruder system 1 shown in FIG. 1 comprises a drive 10 that is selectively switchable between a first drive direction D1 (FIG. 6A) and a second drive direction D2 (FIG. 6B). The first drive direction D1 is associated with driving the screw conveyor 7 in a first convey direction C1 for conveying the extrudable material 5 downstream towards the extrusion nozzle 8 (FIG. 3A). The second drive direction D2, that is directed opposite relative to the first drive direction D1, is associated with stopping the flow F of extrudable material 5 out of said extrusion nozzle 8 (FIG. 3B). This configuration allows the extruder system 1 to be controlled by a conventional controller with state of the art software, which greatly improves the applicability. After all, there is no need for dedicated tailor-made software. All functionality of common software, such as all adjustable parameters used to control a retracting, may be used in an identical manner.

The drive 10 may drive a drive system 11, such as a pulley system 11, comprising a first pulley 12 and a second pulley 13, that are connected via a belt 14. This belt 14 is preferably a toothed belt 15 to prevent slip between the belt 14 and the first and second pulleys 12, 13. Using a toothed belt 15, the rotation of the screw conveyor 7 and the plunger 9 may be accurately controlled.

When the drive 10 is driven in the second drive direction D2 (FIG. 6B), it is configured to stop driving the screw conveyor 7 in the first convey direction D1. A state wherein the screw conveyor 7 has just stopped is shown in FIG. 3B. For illustrative reasons, an imaginary pressure sensor 16 is shown, that indicates the pressure of the extrudable material 5 shortly upstream of the extrusion nozzle 8. In FIG. 3B, the pressure has already significantly dropped relative to the pressure indicated on the pressure sensor 16 in FIG. 3A. Nevertheless, the remaining pressure may still cause oozing of the extrudable material 5, as shown by the droplet of extrudable material 5 hanging out of the extrusion nozzle 8.

Figure 2:
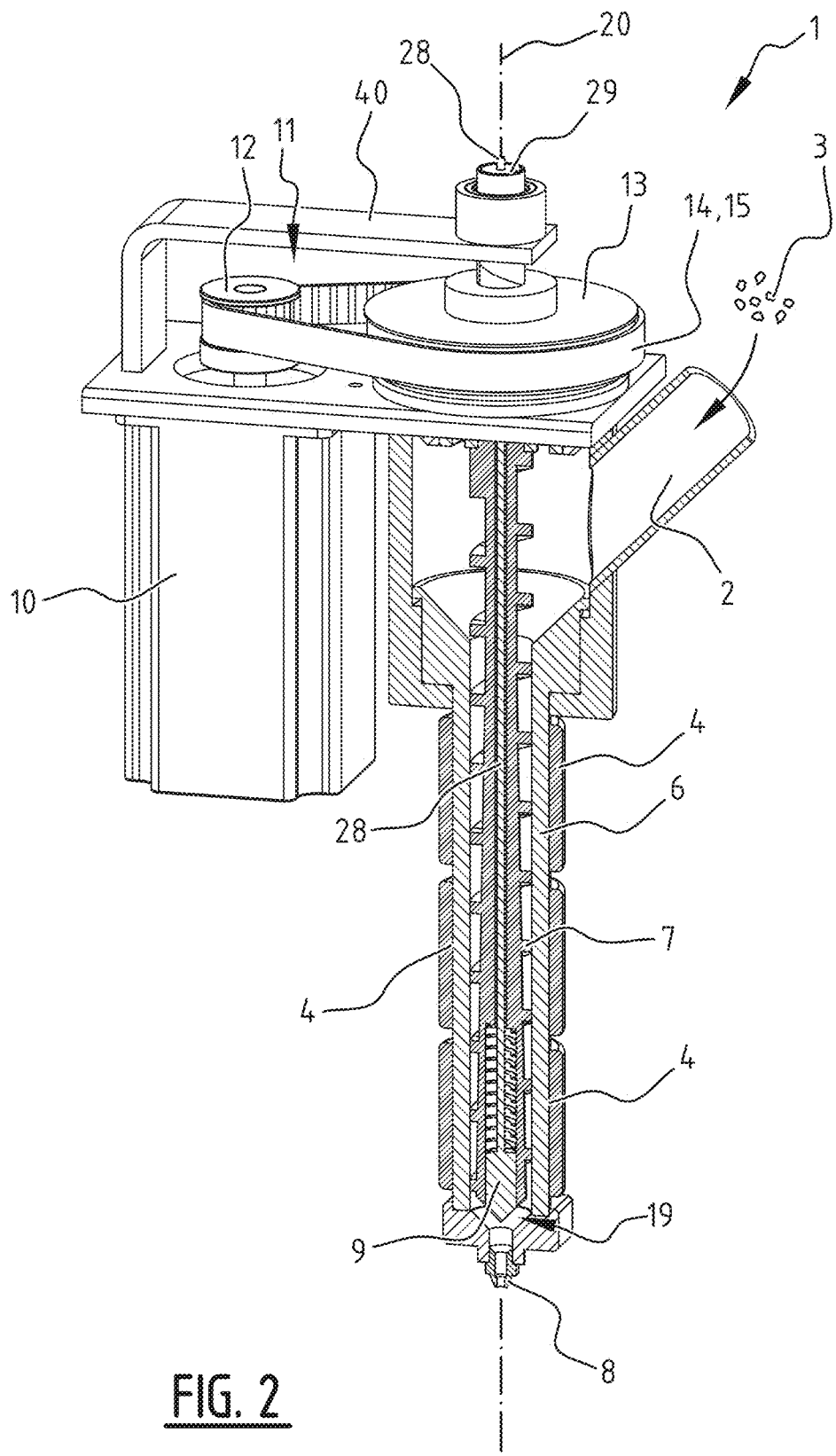
FIG. 2 is a partially cross-sectional perspective view of an extruder system according to a first or a second preferred embodiment.

In the shown preferred embodiments of the extruder system 1, the drive 10 is configured to drive both the screw conveyor 7 and drive retraction of the plunger 9. When the plunger 9 is retracted in the direction R that is upstream relative to the flow F (FIG. 3C), the plunger 9 is moved against a spring 17. This spring 17 functions as a pretensioner 18 that is configured to force the plunger 9 towards a tip 19 of the screw conveyor 7. The plunger 9 is arranged in the screw conveyor 7, more in particular in the tip 19 of the screw conveyor 7. As can be best seen in FIG. 3C, the plunger 9 is configured to axially move along a rotation axis 20 (FIGS. 1 and 2) of the screw conveyor 7.

Referring again to FIG. 3B, when the drive 10 is driven in the second drive direction D2 (FIG. 6B), said drive 10 may be configured to simultaneously stop driving the screw conveyor 7 in the first convey direction C1 and move the plunger 9 away from and upstream relative to the extrusion nozzle 8. Please note that stopping driving of the screw conveyor 7 in the first convey direction C1 does explicitly cover both the situation that the screw conveyor 7 is stopped from being driven at all (FIG. 3C), i.e. it stops rotating, but also covers the situation wherein the screw conveyor 7 is driven in a second convey direction C2, that is opposite the first convey direction C1. This latter situation will be discussed in more detail for the second preferred embodiment shown in FIG. 7.

In FIGS. 4, 5, 6A and 6B, the first preferred embodiment is shown in more detail. The screw conveyor 7 is rotatably suspended by a ball bearing 21. The extruder system 1 according to the first preferred embodiment further comprises a one-way bearing 22 that is configured to decouple the drive 10 and the plunger 9 to allow the plunger 9 to be maintained in an extended position (FIG. 3A) when the drive 10 is driven in the first drive direction D1 (FIG. 6A), and to couple the drive 10 to the plunger 9 to allow the drive 10 to retract the plunger 9 to a retracted position (FIG. 3C) when the drive 10 is driven in the second drive direction D2 (FIG. 6B). The extended position of the plunger 9 is a downstream extended position relative to the flow F. Due to this one-way bearing 22, a single drive 10 suffices to drive the screw conveyor 7 and to retract the plunger 9. If only a single drive 10 is sufficient, the extruder system 1 may be relatively light weight. After all, a second drive is redundant. A light weight extruder improves practical use, for example it allows for faster and more reliable displacement of the extruder system 1, for example if the extruder system is an extruder system, in particular a print head, of an additive manufacturing printer. "AM printer".

Figure 3C:
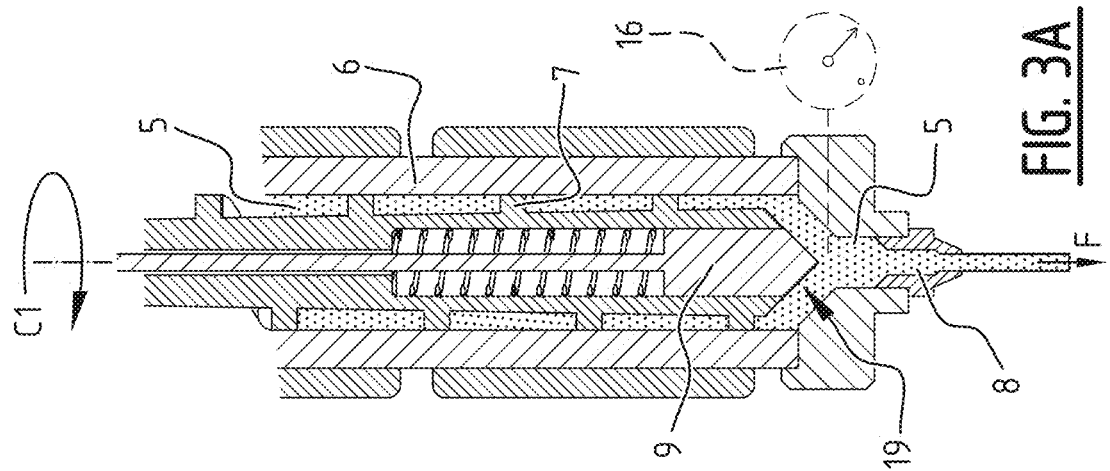
FIG. 3C is a detailed cross-sectional side view after retracting a plunger of the extruder system of FIG. 2.
Figure 5:
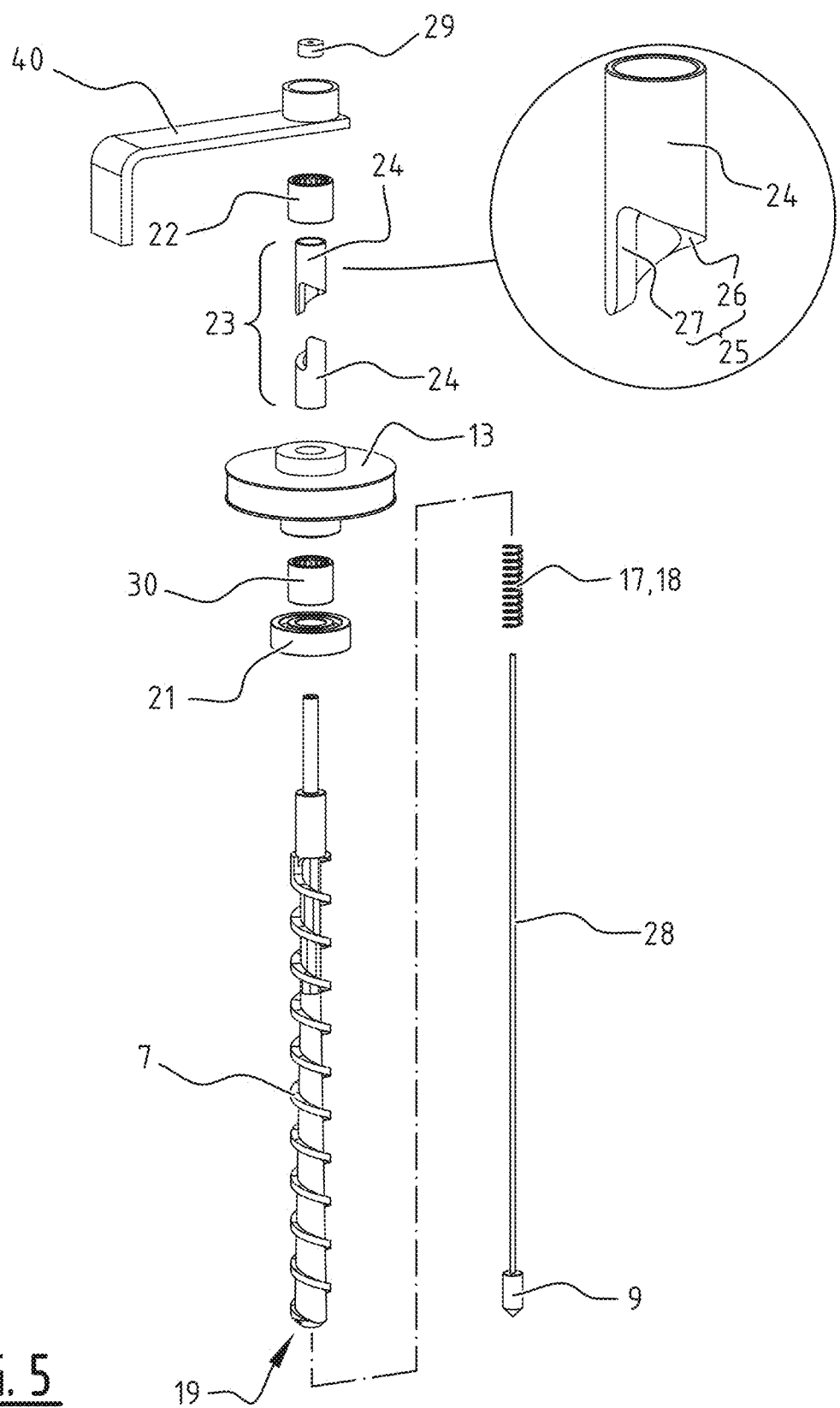
FIG. 5 is an exploded view of the extruder system according to the first preferred embodiment.

In order to cause the retraction R of the plunger 9 shown in FIG. 3C, the extruder system 1 may comprise a coupling 23 that comprises two coupling parts 24 that are rotatable relative to each other and that each comprise a contact surface 25 that exhibits a sloping part 26 and an axial abutment 27. When the drive 10 is driven in the first drive direction D1, the coupling 23 is configured to rotate the coupling parts 24 simultaneously with abutting contact between the axial abutments 27 of their contact surfaces 25. However, when the drive 10 is driven in the second drive direction D2 (FIG. 6B), the coupling 23 is configured to rotate the coupling parts 24 relative to each other by sliding contact along the sloping parts 26 of their contact surfaces 25, to thereby axially extend the coupling 23 and retract the plunger 9 to the retracted position. When the coupling 23 extends, it pushes a plunger rod 28 upward. i.e. upstream relative to flow F. and thereby exerts a force on the plunger 9 that is higher than spring force of the spring 17 that acts as the pretensioner 18. Plunger rod 28 may be connected to a cap 29 that is pushed upwards by the upper one of the two coupling parts 24. When the coupling 23 extends, also the lever arm 40 will move upwards and thereby bend. The resulting bending force pushes the plunger rod 28 and the plunger down. i.e. downstream relative to the flow F, when the drive 10 stops driving in the second drive direction D2. The lever arm 40 allows the one-way bearing 22 to move upwards (FIG. 6B) and supports the one-way bearing 22 such that it is prevented from rotation and can act as a "one-way" bearing. Additionally, the lever arm 40 may support the spring 17 by its bending moment. Preferably, the sloping parts 26 of the contact surface 25 of the two coupling parts 24 define a helical shape (FIG. 5).

For illustrative purposes, the lower coupling part 24 of the two coupling parts 24 of the coupling is shown as an independent part for the first embodiment. This lower coupling part 24 is however fixedly connected to the second pulley 13, and is ideally integrated with the second pulley 13. This preferred integrated situation is shown for the other preferred embodiment, such as for the second preferred embodiment shown in FIG. 7.

The extruder system 1 according to the first preferred embodiment further comprises a further one-way bearing 30. When the drive 10 is driven in the first drive direction D1 (FIG. 6A), this further one-way bearing 30 is configured to couple the drive 10 to the screw conveyor 7 and thereby drive the screw conveyor 7 in the first convey direction C1 (FIG. 3A). Moreover, when the drive 10 is driven in the second drive direction D2, the further one-way bearing 30 is configured to decouple the drive 10 and the screw conveyor 7 to stop driving the screw conveyor 7 in both the first convey direction C1 and the second convey direction C2. If the drive 10 is completely decoupled from the screw conveyor 7, the full capacity of the drive 10 may be used for retracting the plunger 9, allowing for a fast retraction with a relatively lightweight drive 10.

Figure 7:
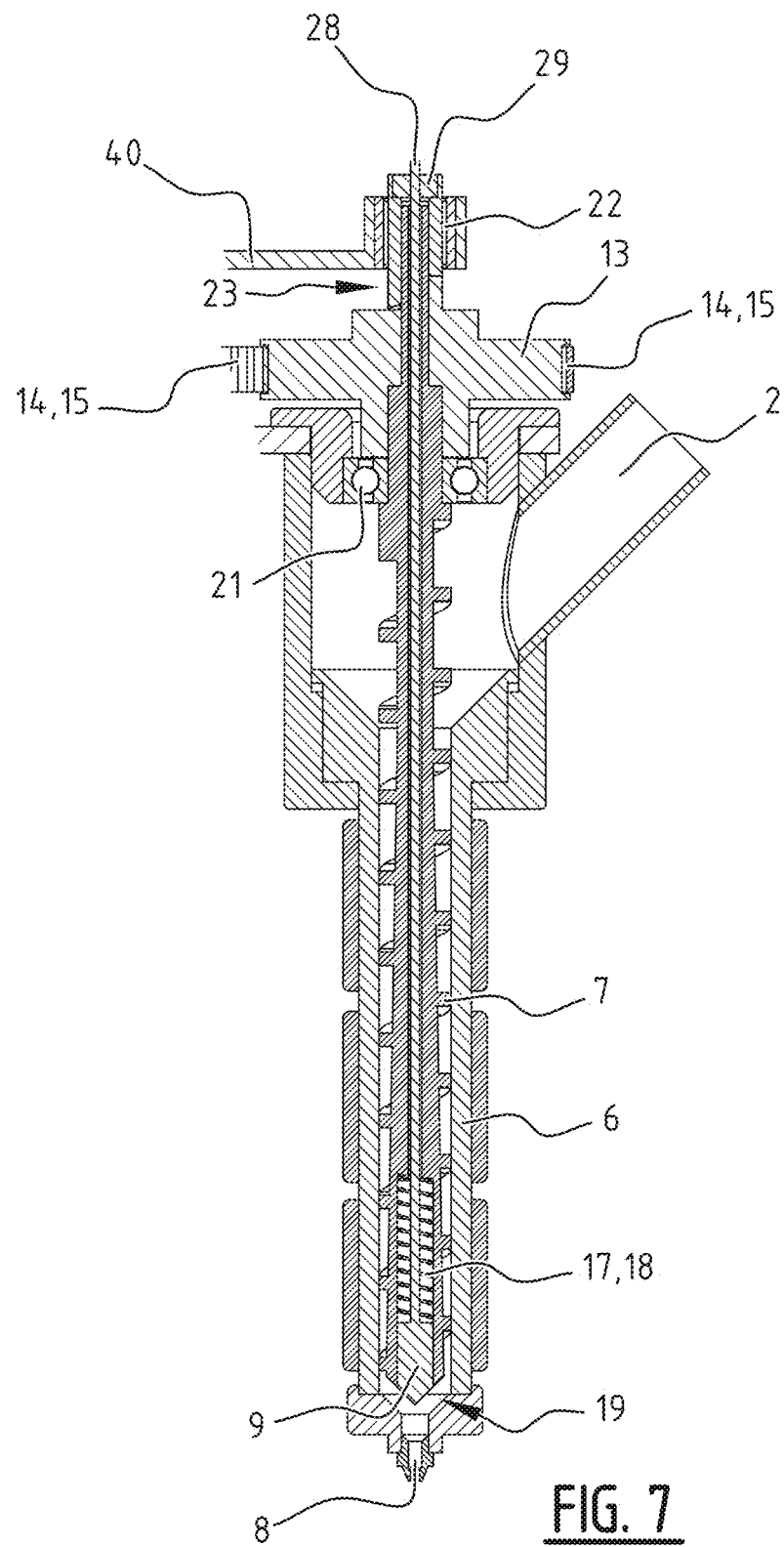
FIG. 7 is a cross-sectional side view of the extruder system according to the second preferred embodiment.

An extruder system 1 according to a second preferred embodiment is shown in FIG. 7. This second preferred embodiment is very closely related to the first preferred embodiment discussed above. Like parts are numbered alike in the figures, and only the difference of the second preferred embodiment relative to the first preferred embodiment is discussed.

Figure 4:
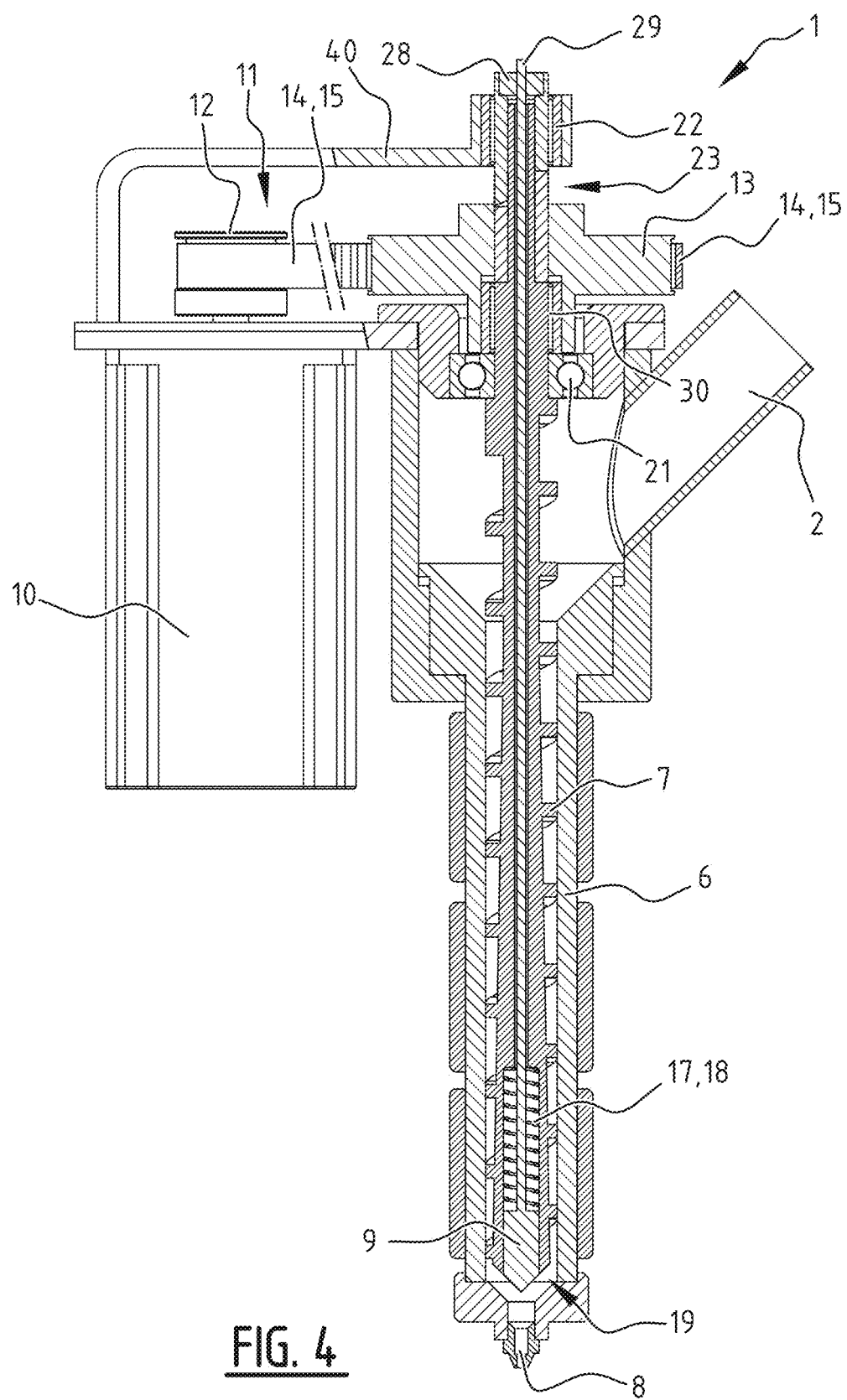
FIG. 4 is a cross-sectional side view of the extruder system according to the first preferred embodiment.

When FIG. 7 and FIG. 4 are compared, it becomes clear that the only difference relative to the first preferred embodiment is the absence of the further one-way bearing 30. Consequently, when the drive 10 of an extruder system 1 according to the second preferred embodiment is driven in the second drive direction D2, the drive 10 is configured to drive the screw conveyor 7 in a second convey direction C2 that is directed opposite to the first convey direction C1, wherein said second convey direction C2 is associated with the screw conveyor 7 moving the extrudable material 5 away from and upstream relative to the extrusion nozzle 8.

Figure 8:
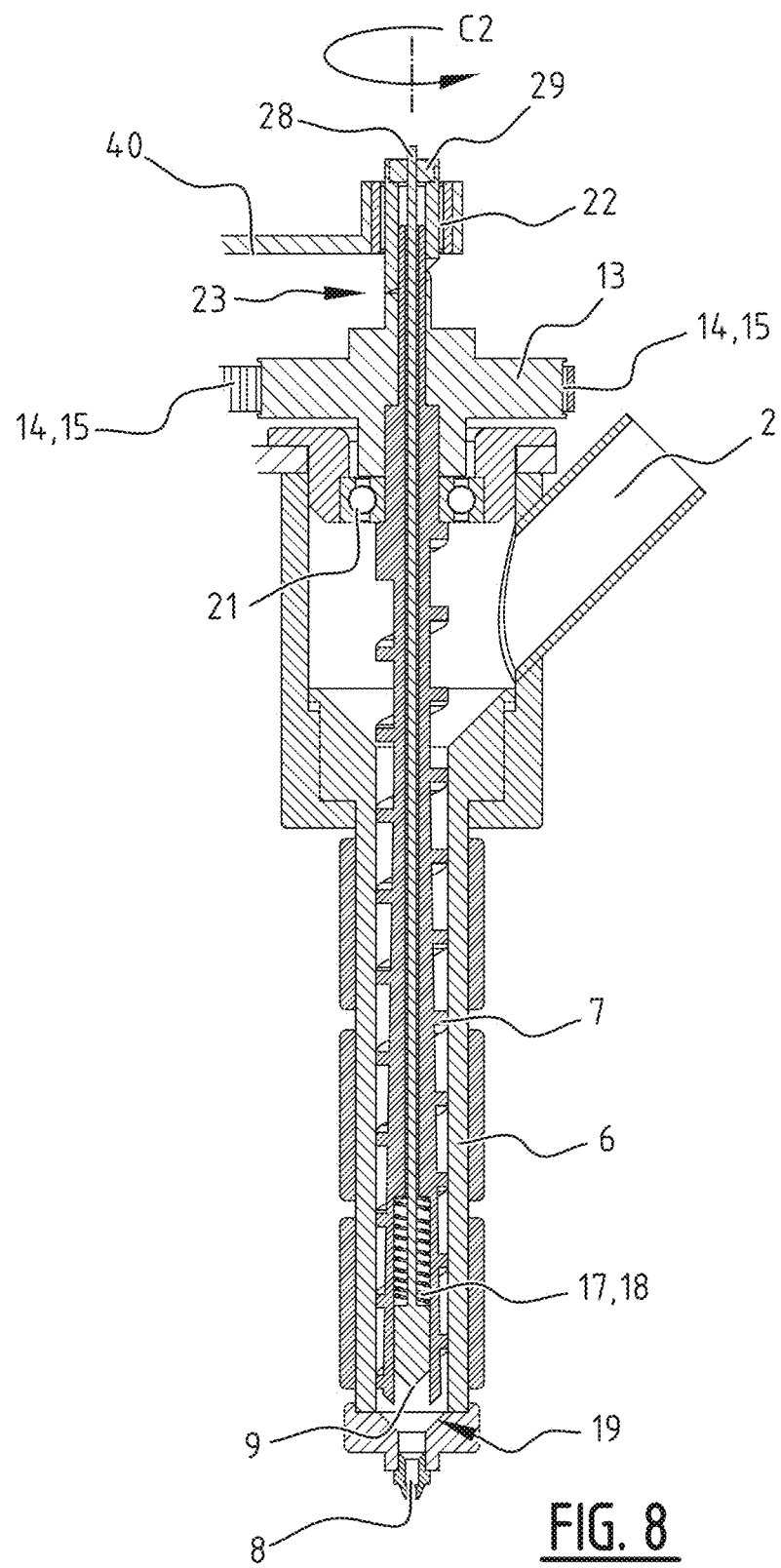
FIG. 8 is a detailed cross-sectional side view during retracting a plunger of the extruder system of FIG. 7.

In a more preferred embodiment, when the drive 10 is driven in the second drive direction D2, said drive 10 is configured to simultaneously drive the screw conveyor 7 in the second convey direction C2 and thereby move the extrudable material 5 away from and upstream relative to the extrusion nozzle 8, and move the plunger 9 away from and upstream relative to the extrusion nozzle 8. Thus, the drive 10 will not only retract the plunger 9, but it will also simultaneously drive the screw conveyor 7 in the second convey direction C2. This is best shown in FIG. 8, that corresponds to FIG. 3C of the first preferred embodiment.

Relative to the first preferred embodiment, the drive 10 of the second preferred embodiment will need to be somewhat stronger and consequently heavier. This embodiment therefore sacrifices some speed but significantly improves the level of retraction of the flow F of the extrudable material 5, which renders this second preferred embodiment especially suitable for extruding material 5 that expands, like foams or low viscosity materials. Furthermore, the second preferred embodiment is beneficial for applications that require relatively long stops. i.e. more than 2 seconds. An advantage of the second preferred embodiment is that the screw conveyor 7 contributes to a pressure release and withdrawal of extrudable material 5, and consequently allows for an increased retraction volume relative to embodiments wherein only the plunger 9 is retracted.

The extruder system 1 according to the third preferred embodiment is also closely related to the first preferred embodiment, and again only the differences are discussed.

The extruder system 1 according to the third preferred embodiment further comprises a valve 31 that is arranged upstream relative to the extrusion nozzle 8 and downstream relative to the screw conveyor 7, wherein said valve 31 is configured to restrict or shut off the flow F of extrudable material 5 towards the extrusion nozzle 8. Such a valve 31 may provide an increased control of the flow F. If the diameter of the plunger 9 is larger than the diameter of the valve 31, an underpressure will be created during retraction of the plunger 9, which further reduces oozing and allows for an even more accurate control of the flow F of extrudable material 5.

Said drive 10 may be configured to at least partially close the valve 31 when the drive 10 is driven in the second drive direction D2. In this way, no additional drive is required. The drive 10 may accurately control the level of restriction, especially if a toothed belt 15 or other non-slip drive system 11 is used.

As can be best seen in FIG. 10, the valve 31 comprises a valve body 32 comprising a passage 33 having a circumferential edge 34 defining a valve seat 35 that is directed towards the extrusion nozzle 8, and a valve plug 36 that is configured to move upstream towards and abut the valve seat 35 when the plunger 9 is moved upstream relative to the extrusion nozzle 8.

The valve plug 36 is arranged downstream of the passage 33 and connected to the plunger 9 via a spacer 37, wherein said spacer 37 extends from the plunger 9 through the passage 33 of the valve body 32 towards the extrusion nozzle 8. In the shown embodiment, a diameter of the plunger 9 is larger than a diameter of the valve plug 36. If the plunger 9 and valve plug 36 are physically linked via the spacer 37, the valve plug 36 and plunger 9 will move as an integral member. Consequently, the valve plug 36 will close off the valve 31, while the plunger 9—that has a larger diameter—causes a suction force during closing off of the valve 31. In this way, risk of oozing is even further reduced.

Figures 11, 12:
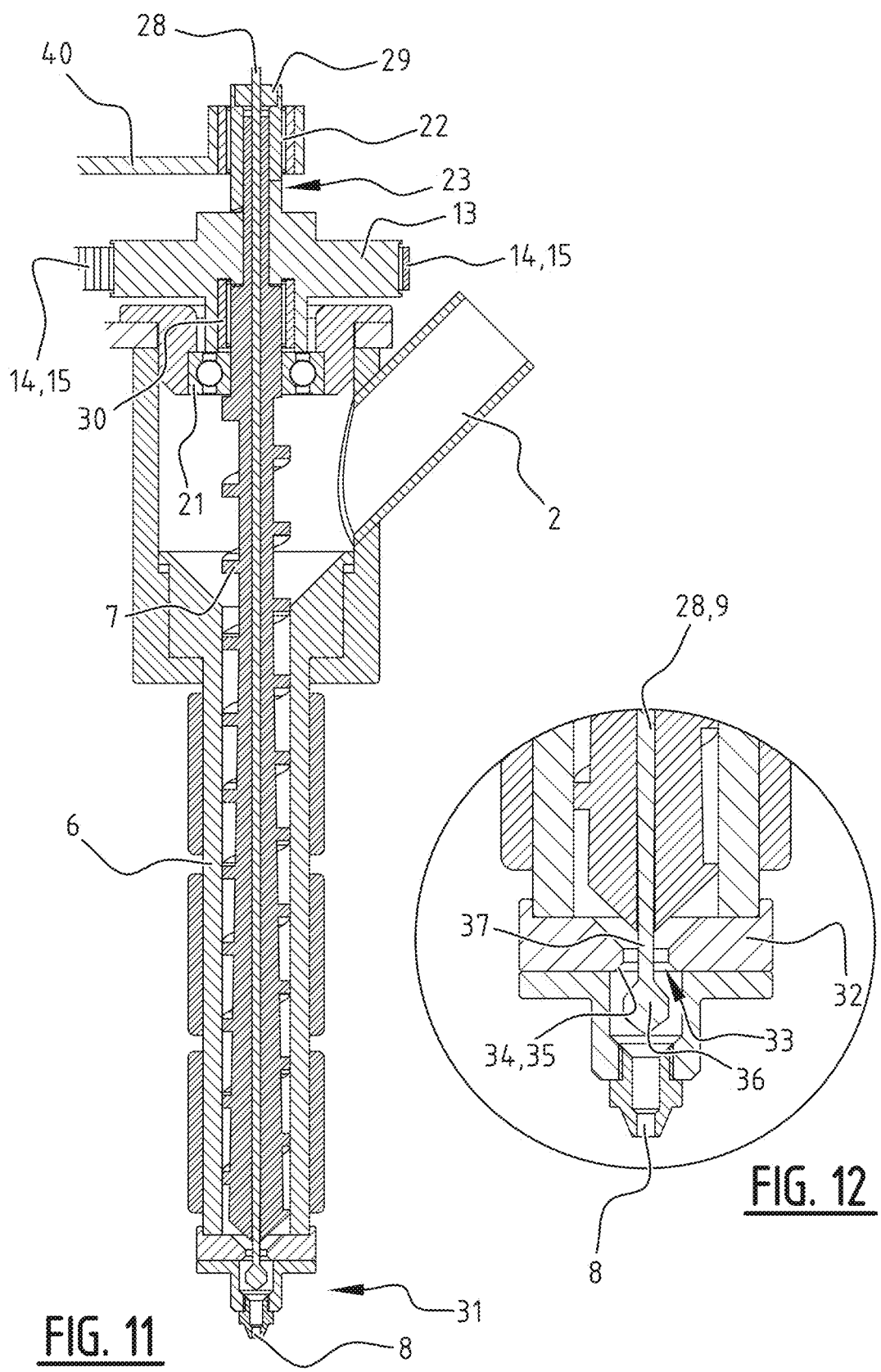
FIG. 11 is a cross-sectional side view of the extruder system according to a fourth preferred embodiment.
FIG. 12 is a detailed cross-sectional side view of the extruder system according to the fourth preferred embodiment of FIG. 11.

A further embodiment is the fourth embodiment shown in FIGS. 11 and 12. This embodiment is closely related to the third preferred embodiment, and the description of the valve 31 described above for the third preferred embodiment applies mutatis mutandis to the fourth preferred embodiment shown in FIGS. 11 and 12. The fourth preferred embodiment differs in that the plunger 9 and the spacer 37 are integrated with the plunger rod 28. In this way, this fourth preferred embodiment applies a plunger 9 that reduces oozing via said valve 31 without directly releasing at least a part of the overpressure caused by the screw conveyor.

The skilled person will understand that the third and the fourth preferred embodiment may alternatively apply only one one-way bearing 22. Thus, the further one-way bearing 30 may be optional. Without the further one-way bearing 30, the working principle is similar to the second preferred embodiment shown in FIGS. 7 and 8.

Figure 13:
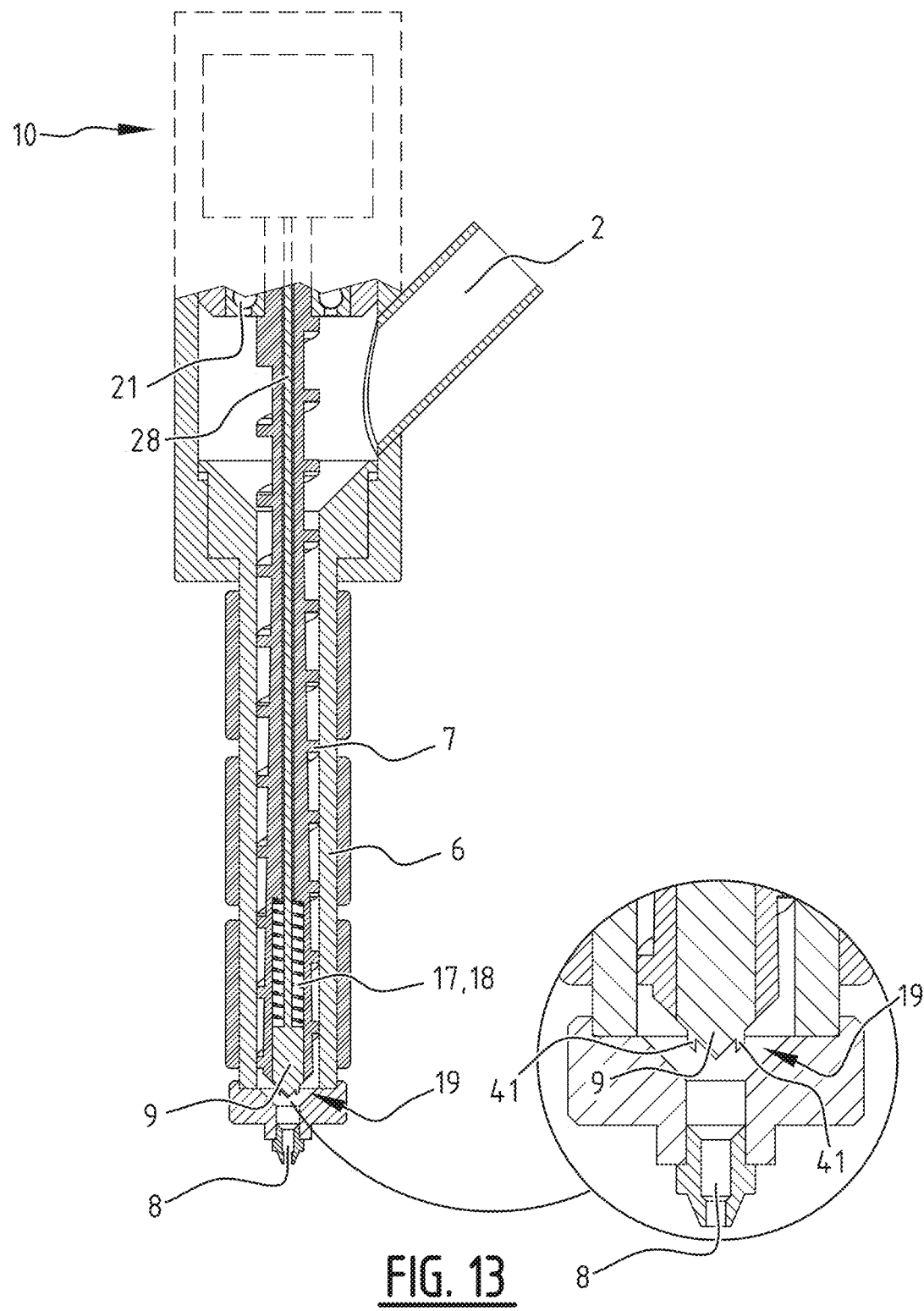
FIG. 13 is a detailed partially cross-sectional view of the extruder system according to a fifth preferred embodiment.

A fifth preferred embodiment of an extruder system 1 according to the invention is shown in FIG. 13. In this partially cross-sectional view, the drive 10 and drive system 11 (that is a transmission in FIG. 13) are arranged in line with the screw conveyor 7 and the extrusion nozzle 8. Relative to a drive 10 and drive system 11 that extend transverse relative to the rotation axis 20 of the second preferred embodiment and best shown in FIGS. 2 and 4, the in-line configuration of the fifth embodiment provides the advantage that stopping and starting of driving the screw conveyor 7 is less likely to cause turbulence in the flow of the extrudable material 5. As already mentioned, the (surface) quality of an additive manufactured product benefits from a laminar flow at the extrusion nozzle. Drive 10 may be a stepper motor, and the plunger rod 28 may extend through a drive shaft of the drive 10. This would allow a coupling (not shown in FIG. 13) to be used that is similar to coupling 23, that has been described in great detail in relation to the first preferred embodiment and that is also applied in the second to fourth preferred embodiments.

As also mentioned, the (surface) quality of an additive manufactured product benefits from a homogeneous melt of extrudable material 5 having a constant temperature and viscosity. In order to further optimize the homogeneity of the extrudable material 5, the fifth preferred embodiment further comprises one or more than one protrusion 41 extending from the plunger 9. The fifth embodiment shown in FIG. 13 comprises four protrusions 41 extending axially from the plunger. The protrusions 41 cause a mixing of the extrudable material 5 due to the plunger 9 rotating along with the screw conveyor 7, and thereby increase the homogeneity of the extrudable material 5 at the extrusion nozzle 8. The temperature and/or viscosity of extrudable material 5 that is retracted by the plunger 9 (in a state conform FIG. 7 of the second preferred embodiment) may change. However, when extrusion is continued and the plunger 9 extends again towards the extrusion nozzle 8, the mixing action of the protrusions 41 at the end of the plunger 9 that rotates together with the screw conveyor 7 causes a homogenous mixture of extrudable material 5 at the extrusion nozzle 8.

The in-line arrangement of the drive 10 and drive system 11 on the one hand, and the one or more than one protrusion 41 that facilitate mixing on the other hand, both contribute to an improved (surface) quality of an additive manufactured product due to preventing turbulence and thereby promoting a laminar flow, and by providing a mixing effect, respectively. However, the skilled person will understand that the in-line arrangement of the drive 10 and drive system 11 and protrusions 41 may be applied independently. For example, also embodiments one to four may be provided with one or more than one protrusion 41 extending from the plunger 9.

The invention further relates to an additive manufacturing printer, "AM printer" 38, comprising an extruder system 1 according to the invention, and a controller 39 configured to cause the extruder system 1 to, when executing computer-executable printing instructions for printing an object, print said object.

Although they show preferred embodiments of the invention, the above described embodiments are intended only to illustrate the invention and not to limit in any way the scope of the invention. Accordingly, it should be understood that where features mentioned in the appended claims are followed by reference signs, such signs are included solely for the purpose of enhancing the intelligibility of the claims and are in no way limiting on the scope of the claims. Furthermore, it is particularly noted that the skilled person can combine technical measures of the different embodiments. The scope of protection is defined solely by the following claims.

The invention claimed is:

1. An extruder system, comprising:
   a supply configured to receive raw material and comprising a heater configured to melt the raw material into extrudable material;
   an extruder configured to receive the extrudable material from the supply and comprising a screw conveyor configured to convey the extrudable material towards an extrusion nozzle of the extruder and cause an overpressure inside the extruder causing selective extrusion via said extrusion nozzle; and
   a plunger arranged coaxially with the screw conveyor at or near the extrusion nozzle and configured to move against a spring to selectively release at least a part of the overpressure and thereby control a flow of the extrudable material out of said extrusion nozzle to reduce oozing of the extrudable material after stopping said flow.

2. The extruder system according to claim 1, further comprising a drive that is selectively switchable between a first drive direction associated with driving the screw conveyor in a first convey direction for conveying the extrudable material downstream towards the extrusion nozzle, and a second drive direction, opposite relative to the first drive direction, and associated with stopping the flow of extrudable material out of said extrusion nozzle.

3. The extruder system according to claim 2, wherein the drive, when driven in the second drive direction, is configured to stop driving the screw conveyor in the first convey direction.

4. The extruder system according to claim 2, wherein the drive, when driven in the second drive direction, is configured to drive the screw conveyor in a second convey direction that is directed opposite to the first convey direction, wherein said second convey direction is associated with the screw conveyor moving the extrudable material away from and upstream relative to the extrusion nozzle.

5. The extruder system according to claim 2, wherein the drive is configured to drive both the screw conveyor and a retraction of the plunger.

6. The extruder system according to claim 5, wherein, when the drive is driven in the second drive direction, said drive is configured to simultaneously stop driving the screw conveyor in the first convey direction and move the plunger away from and upstream relative to the extrusion nozzle.

7. The extruder system according to claim 5, wherein, when the drive is driven in the second drive direction, said drive is configured to simultaneously drive the screw conveyor in the second convey direction and thereby move the extrudable material away from and upstream relative to the extrusion nozzle, and move the plunger away from and upstream relative to the extrusion nozzle.

8. The extruder system according to claim 2, further comprising a one-way bearing that is configured to:
   decouple the drive and the plunger to allow the plunger to be maintained in an extended position when the drive is driven in the first drive direction; and
   couple the drive to the plunger to allow the drive to retract the plunger to a retracted position when the drive is driven in the second drive direction.

9. The extruder system according to claim 8, further comprising a coupling that comprises two coupling parts that are rotatable relative to each other and that each comprise a contact surface that exhibits a sloping part and an axial abutment, the coupling configured to:
   rotate the coupling parts simultaneously with abutting contact between the axial abutments of their contact surfaces when the drive is driven in the first drive direction; and
   rotate the coupling parts relative to each other by sliding contact along the sloping parts of their contact surfaces when the drive is driven in the second drive direction, to thereby axially extend the coupling and retract the plunger to the retracted position.

10. The extruder system according to claim 9, wherein the sloping parts of the contact surface of the two coupling parts define a helical shape.

11. The extruder system according to claim 8, further comprising a further one-way bearing that is configured to:
   couple the drive to the screw conveyor and thereby drive the screw conveyor in the first convey direction when the drive is driven in the first drive direction; and
   decouple the drive and the screw conveyor to stop driving the screw conveyor in both the first convey direction and the second convey direction when the drive is driven in the second drive direction.

12. The extruder system according to claim 2, further comprising a valve arranged upstream relative to the extrusion nozzle and downstream relative to the screw conveyor, wherein said valve is configured to restrict or shut off the flow towards the extrusion nozzle, and wherein said drive is configured to at least partially close the valve when driven in the second drive direction.

13. The extruder system according to claim 12, wherein the valve comprises:
   a valve body comprising a passage having a circumferential edge defining a valve seat directed towards the extrusion nozzle; and
   a valve plug configured to move upstream towards and abut the valve seat when the plunger is moved upstream relative to the extrusion nozzle.

14. The extruder system according to claim 13, wherein the valve plug is:
   arranged downstream of the passage; and
   connected to the plunger via a spacer, wherein said spacer extends from the plunger through the passage of the valve body towards the extrusion nozzle.

15. The extruder system according to claim 13, wherein the plunger reduces oozing via said valve without directly releasing at least a part of the overpressure.

16. The extruder system according to claim 1, wherein the plunger is arranged in the screw conveyor.

17. The extruder system according to claim 16, wherein the plunger is arranged in a tip of the screw conveyor.

18. The extruder system according to claim 16, wherein the plunger is configured to axially move along a rotation axis of the screw conveyor.

19. The extruder system according to claim 1, wherein at least one of:
   the spring is configured as a pretensioner configured to force the plunger towards a tip of the screw conveyor;
   the raw material is a granulate and the extruder system is a granulate extruder system;
   the supply is integrated in an upstream part of the extruder; or
   the extruder system is an extruder system of an additive manufacturing printer (AM printer).

20. An additive manufacturing printer (AM printer), comprising:
   an extruder system according to claim 1; and
   a controller configured to cause the extruder system to print an object by executing computer-executable printing instructions for printing said object.

* * * * *